United States Patent
Ferlitsch (10) Patent No.: US 7,706,017 B2
(45) Date of Patent: Apr. 27, 2010

(54) SYSTEMS AND METHODS FOR PROVIDING LOAD BALANCE RENDERING FOR DIRECT PRINTING

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 687 days.

(21) Appl. No.: 11/125,524

(22) Filed: May 10, 2005

(65) Prior Publication Data

US 2005/0206917 A1 Sep. 22, 2005

Related U.S. Application Data

(63) Continuation-in-part of application No. 10/396,201, filed on Mar. 25, 2003, now Pat. No. 7,265,860, which is a continuation-in-part of application No. 09/964,985, filed on Sep. 26, 2001, which is a continuation-in-part of application No. 09/894,928, filed on Jun. 28, 2001, now Pat. No. 7,480,068, which is a continuation-in-part of application No. 09/681,409, filed on Mar. 30, 2001, now abandoned, and a continuation-in-part of application No. 09/681,416, filed on Mar. 30, 2001, now Pat. No. 7,046,384, which is a continuation-in-part of application No. 09/681,208, filed on Feb. 22, 2001, now abandoned.

(60) Provisional application No. 60/261,132, filed on Jan. 11, 2001.

(51) Int. Cl.
*G06F 15/00* (2006.01)

(52) U.S. Cl. .................. 358/1.5; 358/1.15; 358/1.1; 358/296; 709/201; 709/247

(58) Field of Classification Search ............... 358/296, 358/1.15, 1.13, 1.16, 1.5, 1.1, 1.18; 355/202, 355/200; 395/114, 163, 113; 709/201, 219, 709/247; 710/104
See application file for complete search history.

(56) References Cited

U.S. PATENT DOCUMENTS 5,287,194 A * 2/1994 Lobiondo .................. 358/296

(Continued)

FOREIGN PATENT DOCUMENTS

EP 0483984 5/1992

(Continued)

*Primary Examiner*—Benny Q Tieu
*Assistant Examiner*—Ashish K Thomas
(74) *Attorney, Agent, or Firm*—Kirton & McConkie; Michael F. Krieger; Adam D. Stevens (57) ABSTRACT

Systems and methods for rendering a document in a native format at an imaging device using a host service for rendering into printer ready data. Documents/images are despooled to an imaging device in their native format for printing, wherein the imaging device includes the capability of discovering application/print server processes that render the document in its native format into a format compatible with the imaging device. The imaging device broadcasts job rendering requirements to one or more application/imaging servers, which in turn provide a response to the broadcast. One or more of the application/imaging servers are selectively chosen for use in rendering the document/print job, providing the device specific rendered job to the imaging device for rendering. In addition, when multiple compatible services are available, an optimal host service is determined and used for rendering into printer ready data.

25 Claims, 8 Drawing Sheets

U.S. PATENT DOCUMENTS

| | | | | |
|---|---|---|---|---|
| 5,333,246 A * | 7/1994 | Nagasaka | ................... | 345/619 |
| 5,978,559 A * | 11/1999 | Quinion | ................... | 358/1.15 |
| 5,978,560 A * | 11/1999 | Tan et al. | ................... | 358/1.15 |
| 5,978,650 A | 11/1999 | Fischer et al. | ................. | 725/73 |
| 6,061,142 A | 5/2000 | Shim | ........................ | 358/1.14 |
| 6,348,971 B2 * | 2/2002 | Owa et al. | ................. | 358/1.15 |
| 6,452,692 B1 * | 9/2002 | Yacoub | .................... | 358/1.15 |
| 6,469,796 B1 * | 10/2002 | Leiman et al. | ............. | 358/1.15 |
| 6,498,656 B1 * | 12/2002 | Mastie et al. | ............. | 358/1.15 |
| 6,825,943 B1 * | 11/2004 | Barry et al. | ................ | 358/1.15 |
| 6,965,958 B1 * | 11/2005 | Sugiyama | .................. | 710/104 |
| 7,016,061 B1 * | 3/2006 | Hewitt | ....................... | 358/1.15 |
| 7,092,983 B1 * | 8/2006 | Tyrrell, III | ................ | 709/201 |
| 7,180,614 B1 | 2/2007 | Senoo et al. | | |
| 2001/0043365 A1 * | 11/2001 | Kremer et al. | ............. | 358/1.16 |
| 2002/0063887 A1 * | 5/2002 | White | ....................... | 358/1.15 |
| 2004/0012813 A1 | 1/2004 | Wu et al. | ................... | 358/1.16 |
| 2004/0130744 A1 | 7/2004 | Wu et al. | ................... | 358/1.15 |
| 2004/0184074 A2 * | 9/2004 | Leiman et al. | ............. | 358/1.15 |

FOREIGN PATENT DOCUMENTS

| | | |
|---|---|---|
| JP | 2000059560 | 2/2000 |
| JP | 2001-265556 | 9/2001 |
| JP | 2004009421 | 1/2004 |
| JP | 2005-078461 | 3/2005 |

* cited by examiner

SYSTEMS AND METHODS FOR PROVIDING LOAD BALANCE RENDERING FOR DIRECT PRINTING

RELATED APPLICATIONS

This application is a continuation-part (CIP) of U.S. patent application Ser. No. 10/396,201, filed on Mar. 25, 2003 now U.S. Pat. No. 7,265,860, entitled "LOAD BALANCING PRINT JOBS ACROSS MULTIPLE PRINTING DEVICES," invented by Andrew Rodney Ferlitsch, which is a continuation-in-part (CIP) of U.S. patent application Ser. No. 09/964,985, filed on Sep. 26, 2001, entitled "METHODS AND SYSTEMS FOR PRINTING DEVICE LOAD BALANCING," invented by Andrew Rodney Ferlitsch. et al., which is a continuation-in-part (CIP) of application Ser. No. 09/894,928, filed on Jun. 28, 2001, entitled "METHODS AND SYSTEMS FOR PAGE-INDEPENDENT SPOOL FILE SHEET ASSEMBLY," invented by Andrew Rodney Ferlitsch et al, now U.S. Pat. No. 7,480,068; which is a continuation-in-part (CIP) of two U.S. Patent Applications; U.S. patent application Ser. No. 09/681,409, filed on Mar. 30, 2001 now abandoned, entitled "METHODS AND SYSTEMS FOR PRINT-PROCESSOR-BASED PRINTER STATUS DETECTION AND PRINT TASK DISTRIBUTION," invented by Andrew Rodney Ferlitsch. et al., and U.S. patent application Ser. No. 09/681,416, filed on Mar. 30, 2001, entitled "METHODS AND SYSTEMS FOR PRINT-PROCESSOR-BASED PRINT TASK ERROR RECOVERY," invented by Andrew Rodney Ferlitsch, et al., now U.S. Pat. No. 7,046,384; both of which are continuation-in-part patent applications of U.S. patent application Ser. No. 09/681,208, filed on Feb. 22, 2001 now abandoned, entitled "METHODS AND SYSTEMS FOR PRINT-PROCESSOR-MODIFIED PRINTING," invented by Andrew Rodney Ferlitsch, et al., which claims the benefit of U.S. Provisional Application Ser. No. 60/261,132, entitled "METHODS AND SYSTEMS FOR PRINT-PROCESSOR-MODIFIED PRINTING," invented by Andrew Rodney Ferlitsch. et al., filed on Jan. 11, 2001.

BACKGROUND OF THE INVENTION

1. Field of the Invention

The present invention relates to document rendering. In particular, the present invention relates to systems and methods for rendering a document in a native format at a printer device using a host service for rendering into printer ready data. In addition, when multiple compatible services are available, an optimal host service is determined and used for rendering into printer ready data.

2. Background and Related Art

When a document is to be printed, the corresponding print job is typically in either a printer ready format or converted into a printer ready format that is compatible with the corresponding printer. Once in the printer ready format, the print job can be pushed to or pulled by the printer.

While techniques are currently available that convert a print job into printer ready data, situations exist where converting the print job into printer ready data is either not convenient or not possible. For example, such situations occur when (i) the host device does not have access to the corresponding printer driver for the printer; (ii) the host device does not have access to the application to convert the document data in graphical primitives for the device; (iii) the print job is initiated at the device and the pull print facility cannot initiate a background print on the device; and/or (iv) the printer receives the print job in the document's native format instead of in printer ready data.

Figure 1:
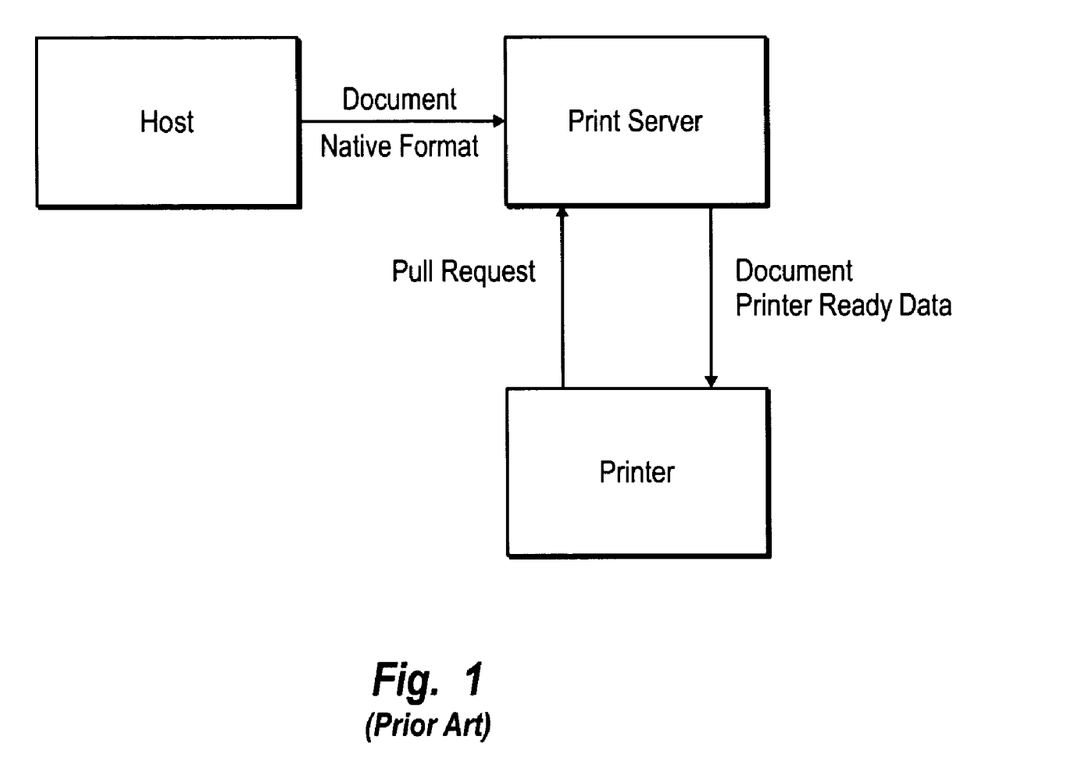
FIG. 1 illustrates a traditional technique, wherein a document is sent in a native format to a print server, which converts it to a printer format and sends it to the printer.

Attempts have been made to solve such problems. For example, one such technique is illustrated as FIG. 1, wherein a document/print job is sent in a native format to a print server, which converts the print job to a printer format and sends it to a printer. Specifically, a user submits a file to the print server in one of several supported native file formats (e.g., MS-Office, PDF, HTML, JPEG), without specifying a target device. To print the file, the user uses a small device that includes a keypad and a liquid crystal display ("LCD"), and is connected between a printer and a local area network ("LAN"). The small device serves two functions. First, a user can access the server via the keypad and pull down a file for printing on the attached printer. Second, the device transmits device identification information to the server, which the server uses to select the appropriate printer driver to convert the print data into printer ready data for the device. This enables remote users to route a job to the output device through the server.

While this method is currently available, several limitations exist. For example, the method cannot perform peer-to-peer printing, it cannot use the pre-existing print subsystem, only a limited number of options on the host can be converted to print options by the server, it cannot initiate printing from the device (e.g., pull printing), and the print server must have the application for the document format and the driver for the printer.

Thus, while techniques currently exist that are used to convert a print job into printer ready data, challenges still exist. Accordingly, it would be an improvement in the art to augment or even replace current techniques with other techniques.

SUMMARY OF THE INVENTION

The present invention relates to document rendering. In particular, the present invention relates to systems and methods for rendering a document in a native format at a printer device using a host service for rendering into printer ready data. In addition, when multiple compatible services are available, an optimal host service is determined and used for rendering into printer ready data.

Implementation of the present invention takes place in association with a printing environment for use in rendering a document/print job. Documents/images are despooled to an imaging device in their native format for printing. In addition, the document/image data can be wrapped in headers for specifying job wide settings. The imaging device broadcasts job rendering requirements to one or more application/imaging servers, which in turn provide a response to the broadcast. One or more of the application/imaging servers are selectively chosen for use in rendering the document/print job, providing the device specific rendered job to the imaging device for rendering.

In at least one implementation of the present invention, a printer device has the capability of discovering application/print server processes that render the document in its native format into a format compatible with the printer device. In a further implementation, the application/print server processes are registered on the printer device. The device then communicates with the 'known' application/print server to determine which application/print server processes can render the document.

When multiple application/print servers respond with the ability of rendering the document for the printer device, the printer device selects the application/print server(s) that will produce the most optimal result, based on any criteria. For example, such criteria can include: (i) availability (i.e., an application/print server that is least busy rendering another print job); (ii) performance (i.e., the application/print server that has the fastest rated rendering speed; (iii) emulation (i.e., the application/print server that can offload processing on the printer by emulating the capability; and/or (iv) job splitting (i.e., rendering can be distributed across more than one application/print server and the rendered results coalesced back into a print job at the printer).

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to document rendering. In particular, the present invention relates to systems and methods for rendering a document in a native format at a printer device using a host service for rendering into printer ready data. In addition, when multiple compatible services are available, an optimal host service is determined and used for rendering into printer ready data.

Embodiments of the present invention take place in association with a printing environment for use in rendering a document/print job. Documents/images are despooled to a printer device in their native format for printing. In addition, the document/image data is wrapped in headers for specifying job wide settings.

In at least one embodiment, a printer device has the capability of discovering application/print server processes that render the document in its native format into a format compatible with the printer device. In a further implementation, the application/print server processes are registered on the printer device. The device then communicates with the 'known' application/print server to determine which application/print server processes can render the document.

When multiple application/print servers respond with the ability of rendering the document for the printer device, the printer device selects the application/print server(s) that will produce the most optimal result, based on any criteria. For example, such criteria can include: (i) availability (i.e., an application/print server that is least busy rendering another print job); (ii) performance (i.e., the application/print server that has the fastest rated rendering speed; (iii) emulation (i.e., the application/print server that can offload processing on the printer by emulating the capability; and/or (iv) job splitting (i.e., rendering can be distributed across more than one application/print server and the rendered results coalesced back into a print job at the printer).

The following disclosure of the present invention is grouped into two subheadings, namely "Exemplary Operating Environment" and "Load Balance Rendering for Direct Printing." The utilization of the subheadings is for convenience of the reader only and is not to be construed as limiting in any sense.

Exemplary Operating Environment

Figure 2:
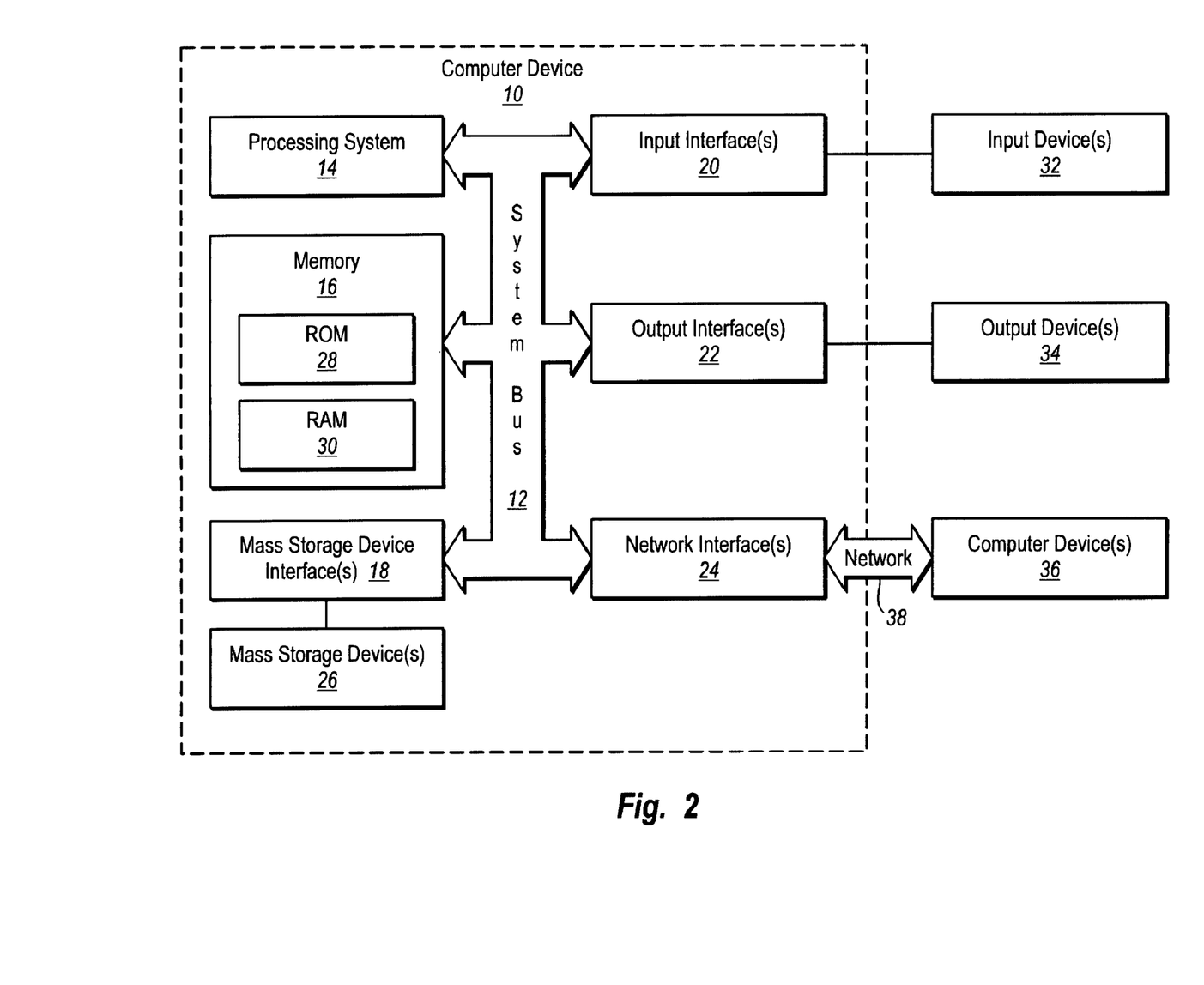
FIG. 2 illustrates a representative system that provides a suitable operating environment for use of the present invention.

FIG. 2 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 2, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 3:
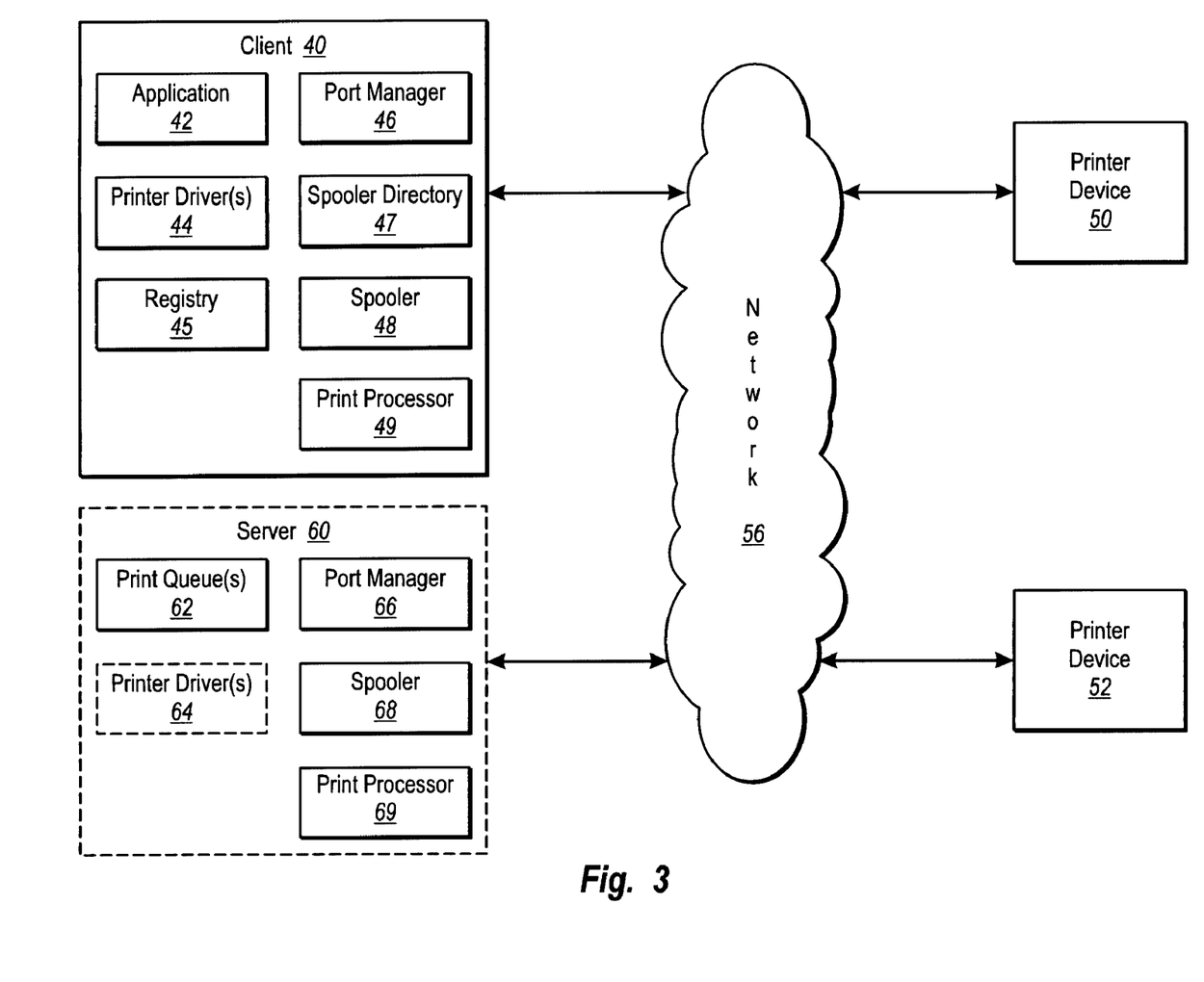
FIG. 3 illustrates a representative networked environment in accordance with an embodiment of the present invention.

While those skilled in the art will appreciate that embodiments of the present invention may be practiced in a variety of different environments with many types of computer system configurations, FIG. 3 represents a representative networked system configuration that may be used in association with the present invention. While FIG. 3 illustrates an embodiment that includes a client, two printers, and optionally a print server connected to a network, alternative embodiments include more than one client, more than two printers, no server, and/or more than one server connected to a network. Other embodiments of the present invention include local, networked, or peer-peer printing environments where one or more computer devices are locally connected to a plurality of printing devices. In at least some embodiments, a time-to-availability attribute is supported at a client, at a server, or by printer firmware. Moreover, embodiments in accordance with the present invention also include wireless networked environments, or where the network is a wide area network, such as the Internet.

The representative system of FIG. 3 includes a computer device, illustrated as client 40, which is connected to a plurality of printing devices (printing devices 50 and 52) across network 56. In FIG. 3, printers 50 and 52 each include printing capabilities. In one embodiment, the capabilities of printer 50 are heterogeneous to the capabilities of printer 52 (e.g., at least one of the capabilities of printer 50 are different from the capabilities of printer 52). In another embodiment, the capabilities of printer 50 are homogeneous to the capabilities of printer 52.

While printers 50 and 52 are connected to network 56, embodiments of the present invention embrace the use of printing devices that are locally connected to a computer device, that are configured in a network peer-to-peer or shared printer (e.g., print server) printing environment, or that are configured in a wireless network environment. Further, the printing devices may be one or more multi-function printers MFPs, remote copiers, facsimile devices, or any device that produces a hard or soft copy output of the input.

In the illustrated embodiment, client 40 includes a software application 42, one or more print drivers 44, a registry 45, a port manager 46, a spool directory 47, a spooler 48, and a print processor 49. A printer server 60 is optionally included having, for example, one or more print queues 62, one or more printer drivers 64, a port manager 66, a spooler 68, and a print processor 69.

Thus, in accordance with the illustrated embodiment and other embodiments of the present invention, a high capacity, continuous or high utilization printing environment is provided for load balance rendering of direct printing. In at least some embodiments, a computer based printing system is provided that includes a printer driver, a print processor, a print spooler, one or more printers, optionally a printer server, and means for initiating one or more print jobs in a local, networked or remote printing environment, wherein the print job loads are selectively balanced across a plurality of printing devices, as will be further explained below.

Load Balance Rendering for Direct Printing

As provided herein, the present invention relates to systems and methods for rendering a document in a native format at a printer device using a host service for rendering into printer ready data. In addition, when multiple compatible services are available, an optimal host service is determined and used for rendering into printer ready data.

At least some embodiments of the present invention relate to (i) communication methods between a printing device and a process on a host, such as establishing a connection over TCP/IP using a socket to a port number, to which the process is listening; (ii) the de-spooling of a print job from a host to a printing device, such as using the LPR, 9100, IPP or SOAP/XML printing protocol from a port monitor to the printing device; (iii) a determination of the availability of a rendering process, such as querying the process using a bidirectional communication for the number and size of jobs being processed/pending by the rendering process; and/or (iv) the splitting of a document in its native format into subdocuments.

As provided herein, a representative environment comprises one or more locally and/or network connected imaging devices, one or more computing devices with a logical connection (e.g., peer-to-peer or managed) to the connected device, and one or more connected imaging servers. Examples of connected imaging devices include, but not limited to: (i) printers, (ii) copiers, (iii) scanners, (iv) facsimile devices, (v) document/image servers, (vi) electronic whiteboards, (vii) digital cameras, (viii) digital projection systems, (ix) CD/DVD writers, (x) a digital television, (xi) a satellite radio, (xii) medical imaging devices (e.g., X-ray, MRI, etc.), and the like. A computing/computer device is any device that can send or receive an imaging job. As provided above, such examples include a desktop PC, mini or mainframe computer, distributed computer network, virtual or guest computing system, or another network connected imaging device, herein referred to as an imaging client. An imaging server is any kind of computing or imaging device that provides managed services to other computing and/or imaging devices.

In one embodiment, the imaging device acts as an output device. The imaging device receives from a client, imaging data and a set of imaging instructions compatible with the device, and renders an output from the imaging data according to the imaging instructions. Examples include: (i) print, (ii) copy, (iii) outbound fax, (iv) filing, (v) publish (e.g., image transfer), (vi) conversion, (vii) video, (viii) audio, etc.

In another embodiment, the imaging device acts as an input device. The imaging device sends to a client, imaging data and a set of imaging instructions compatible with the client, and the client renders an input from the imaging data according to the imaging instructions. Examples include: (i) scan, (ii) inbound fax, (iii) file retrieval, etc.

Figure 4:
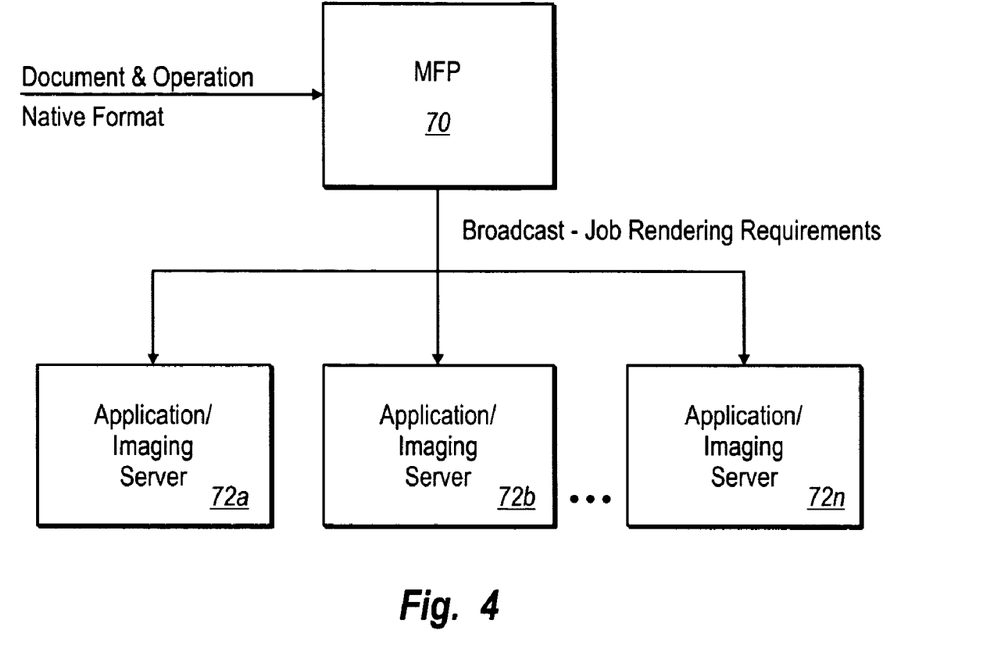
FIG. 4 illustrates a representative environment, wherein the document and MFP operation is sent to the MFP in a native format, and wherein the MFP broadcasts rendering requirements out to application/print servers.
Figure 5:
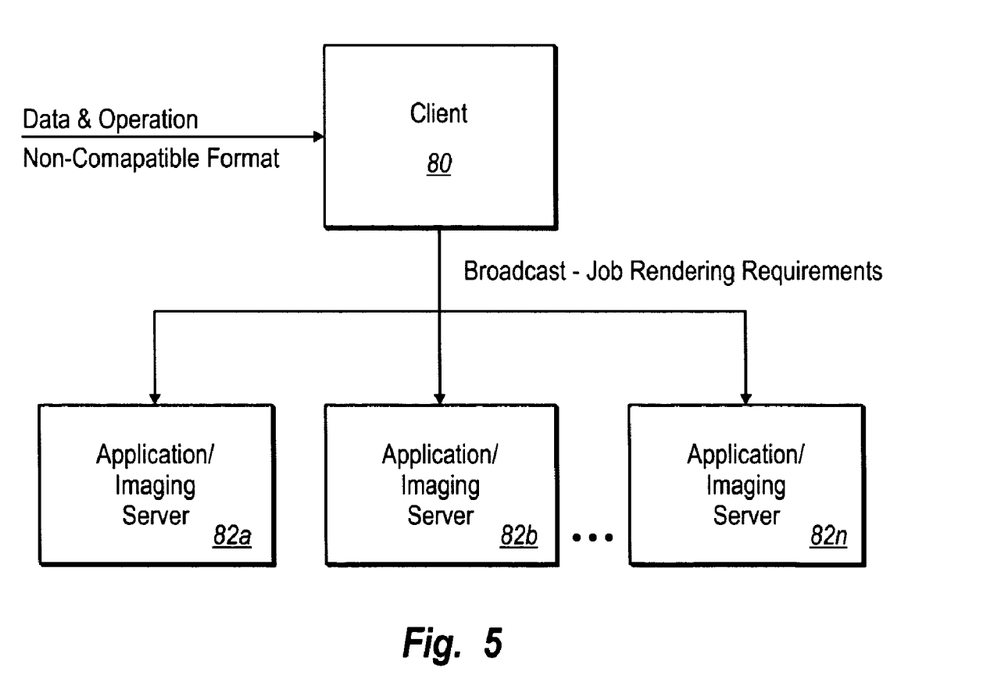
FIG. 5 illustrates a representative input device.

With reference to FIGS. 4-5, representative environments are illustrated that include an imaging or client device that is configured to selectively broadcast job rendering requirements to one or more application/imaging servers. In FIG. 4, a representative environment is illustrated that includes an imaging device (illustrated as MFP 70) in communication with a plurality of application/imaging servers 72. The document and MFP operation is sent to MFP 70 in a native format, and MFP 70 broadcasts rendering requirements out to application/print servers 72.

In one embodiment, the first application/imaging server that confirms it can render the input format of the imaging data into the output format compatible with the imaging device is selected. In another embodiment, the optimal application/imaging server is selected.

Additionally, the imaging device can receive or send imaging data that is not compatible with the imaging device or the client. For example, a document in its native format may be sent to a printer, with printing instructions compatible with the printing, but where the native format of the document cannot be rendered by the printer. As another example, the optical character recognition ("OCR") of a scanned image may be sent to a client, with indexing instructions compatible with the client, but the language format of the data cannot be interpreted by the client.

Thus, reference is made to the representative environment of FIG. 5, which includes a client device 80 and a plurality of application/imaging servers 82. When the imaging device or client receives imaging data that is not compatible with the device or client, the imaging device or client selectively routes the non-compatible imaging data to an application/imaging (e.g., print) server, which is able to render the imaging data into a format compatible, according to some or all of the imaging instructions, for subsequent rendering by the imaging device or client. Thus, in FIG. 5, client 80 receives imaging data that is not compatible with client 80, broadcasts the job rendering requirements, and routes the non-compatible imaging data to an application/imaging servers 82 that is able to render the imaging data into a compatible format, according to some or all of the imaging instructions, for subsequent rendering by client 80.

Additionally, the imaging device or client is able to locate an application/imaging server, which can render the imaging data into a format compatible with the imaging device or client, by a variety of manners, such as by (i) discovery, (ii) registration, and/or (iii) manual entry.

In an alternate embodiment, the sending/receiving of the imaging data is deferred. In this manner, only the imaging instructions and information for locating the imaging data are sent to the imaging device or client.

Figure 6:
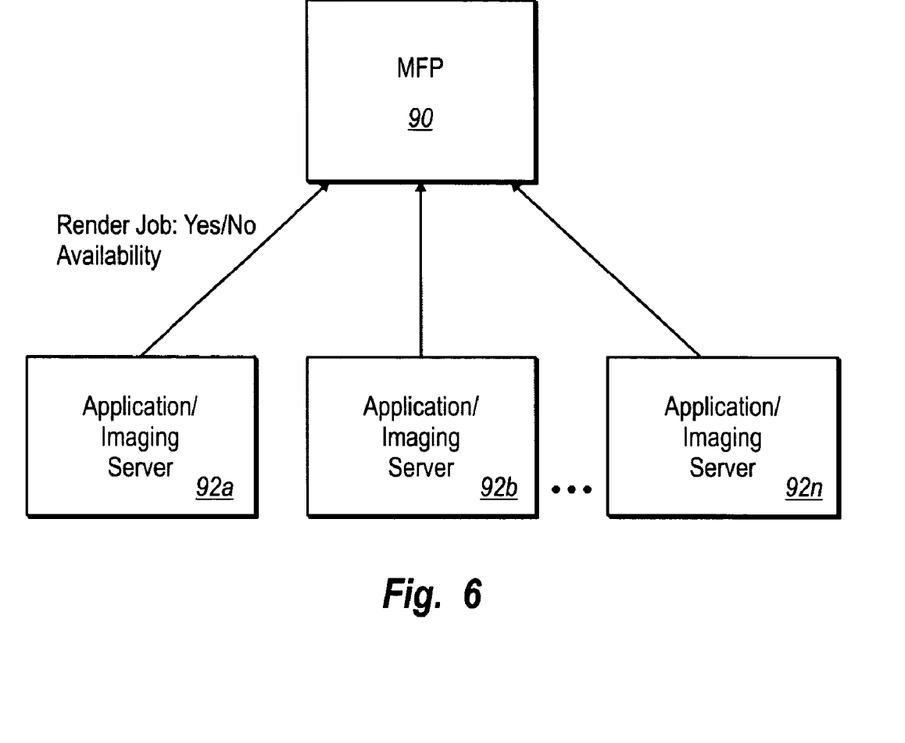
FIG. 6 illustrates representative application/print servers respond as to whether they can render the print job, and when the print job would be available.

As provided herein, once an imaging device or client broadcasts job rendering requirements to one or more application/imaging servers, the application/imaging servers respond to the broadcast. This is illustrated in FIG. 6, wherein an imaging device (MFP 90) has broadcast imaging job requirements to application/imaging servers 92. Such imaging job requirements may include, but are not limited to: (i) format of the imaging data; (ii) rendered format(s) for conversion of the imaging data; and/or (iii) any imaging job instruction that requires emulation (i.e., capability not provided by the imaging device or client).

Each recipient application/imaging server 92 sends a response back indicating its ability to render the job. This bi-directional communication between the imaging device or client and application/imaging server may be performed through (i) a single point-to-point dedicated connection (e.g., local port—USB, Parallel, Serial); (ii) a single virtual connection (e.g., TCP/IP, AppleTalk); or (iii) two separate connections and/or communication protocols.

For example, the imaging device or client establishes a sockets connection over TCP/IP to a pre-specified port, for each of the predetermined application/imaging servers. The device or client then sends the imaging request over the connection to each of the application/imaging servers, using a proprietary data protocol. Each application/imaging server then listens for requests on the pre-specified port. Upon receipt, the application/imaging server sends back a response.

In another example, discovery or identification of application/imaging servers is deferred. The device or client sends a broadcast message over one or more subnets. Any application/imaging server on the subnet(s) listening for imaging request messages then responds.

The response includes, but not limited to: (i) whether it can render the job into one or more of the formats compatible with the imaging device or client; (ii) which imaging job instructions can be emulated on the application/imaging server; (iii) an estimate when the application/imaging server would be available for processing the imaging job; and/or (iv) an estimate to the length of time it would take to process the imaging job.

Figure 7:
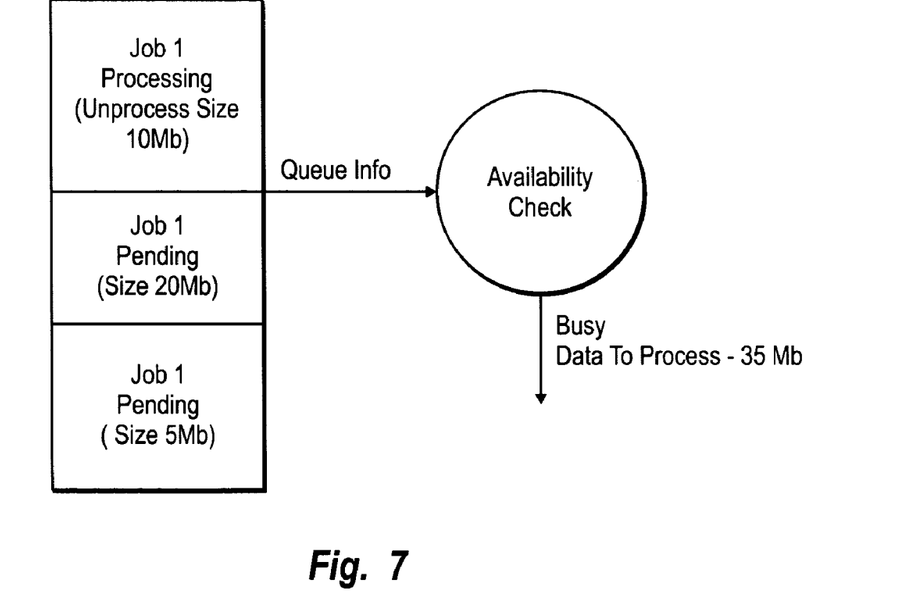
FIG. 7 illustrates an estimate of when an application/imaging server is available.

With reference to FIG. 7, the determination of availability is generally based on the number of pending jobs on the application/imaging server. In one method, the application/imaging server queues requests to an imaging queue. Jobs on the imaging queue are generally processed in a FIFO order, but the order of processing may be by any method. If the imaging queue is empty, the response indicates the application/imaging server is available immediately. Otherwise, the application/imaging server indicates it is busy and returns, if possible, an estimate identifying when it will be available. Such an estimate may be based on, for example, (i) the number of pending jobs; (ii) the size of the pending jobs; and/or (iii) an estimate on the time to render each pending job, based on the size or a pre-analysis of the imaging job.

The response on when the application/imaging server will be available can be based either on time or quantity of work. Additionally, if a job is currently being processed, the application/imaging server may make an estimate based on the amount of the job that is still unprocessed versus estimating on the entire job as if fully unprocessed.

Figure 8:
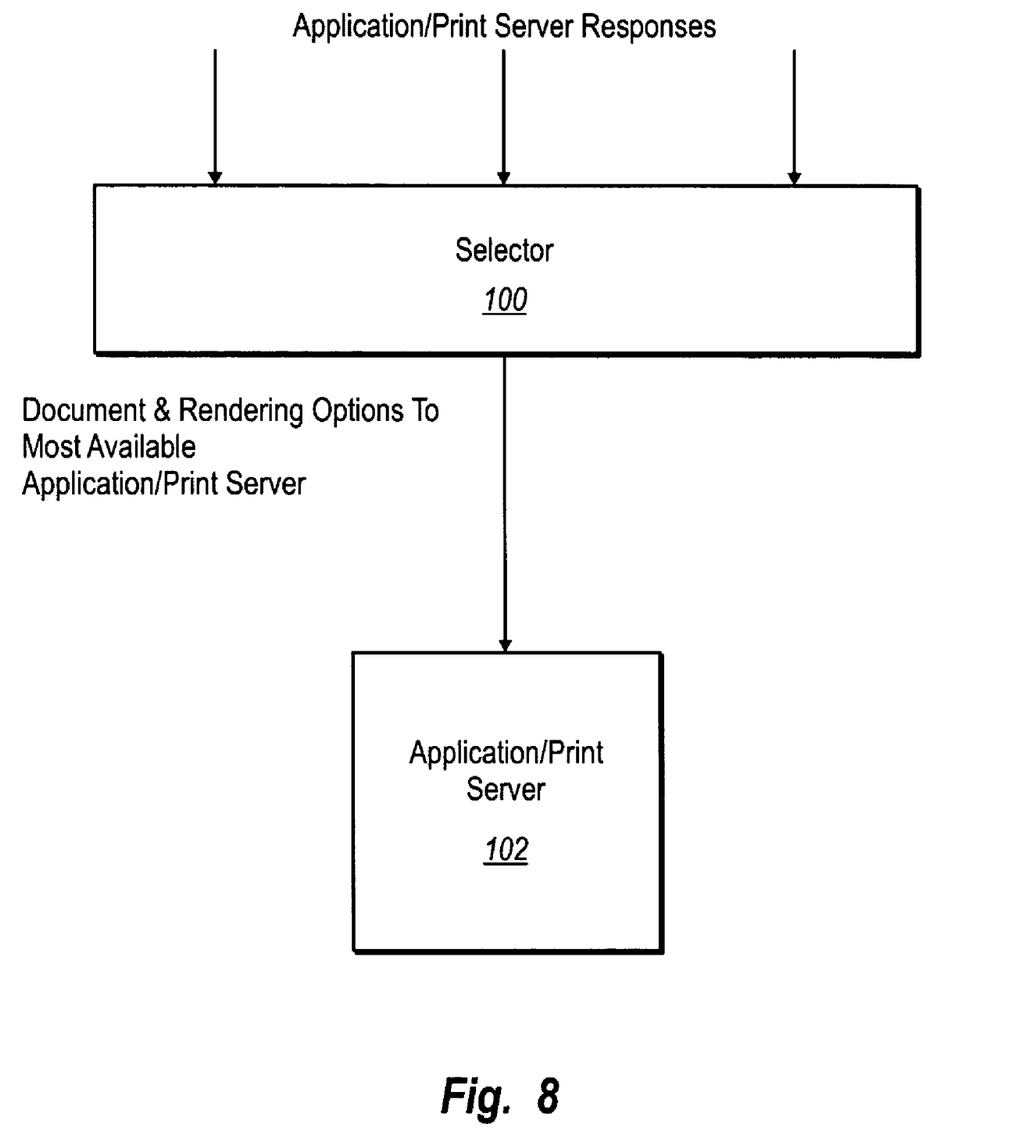
FIG. 8 illustrates a rendering job sent to a most available application/print server.

With reference to FIG. 8, once the imaging device or client broadcasts job rendering requirements to application/imaging servers and the application/imaging servers respond to the broadcast, a determination is made as to use one or more application/imaging servers for the corresponding imaging job. This is illustrated in FIG. 8 as application/print server responses are received by selector 100, which determines which one or more application/print servers 102 will be use. In one embodiment, the imaging device or client examines the responses to select one or more of the application/imaging servers to render the imaging job into a format compatible with the imaging device or client.

In one embodiment, a single application/imaging server is selected. Any optimal selection criteria may be used, such as (i) first available, (ii) performance, (iii) fastest to complete, (iv) emulation, and/or (v) output format. A first available application/imaging server is the one corresponding to the first response received indicating that the server is available. Application/imaging servers reporting available immediately have preference over those reporting busy. When all of the servers are busy, those reporting the least amount of unprocessed work have preference.

Performance relates to the capability of the servers. For example, the application/imaging servers may report a rendering speed, based on the availability and type of resources on the server. Those that report the fastest rendering speed have preference.

Fastest to complete relates to the capability and availability of the servers. For example, combining the availability and speed information an estimate is made for each server as to when the job would be completed. Such methods are disclosed in pending U.S. patent application Ser. No. 10/396,201, which is incorporated by reference.

Emulation relates to efficiency. For example, both the server and the device or client can perform the same imaging instruction (e.g., copy collation, booklet ordering, N-up ordering, etc.), but the device/client determines that the server can perform the function more efficiently (time and resources).

Relating to the output format, the device/client may accept multiple formats (e.g., PCL, PS, Display List for a printer). However, some output formats may be more efficient for processing than others. Thus, the device/client gives preference to the server that can output a more efficient compatible format.

In another embodiment, multiple application/imaging servers are selected. Accordingly, the device/client splits the imaging job into sub-jobs, where sub-jobs are sent to different application/imaging servers and then coalesced back at the device/client. For example, in the case of a print job of a document, the document is split into segments of consecutive pages, and different page sequences are sent to different servers. The size and distribution of the page sequences may be based on any factor, including as those discussed above.

Figure 9:
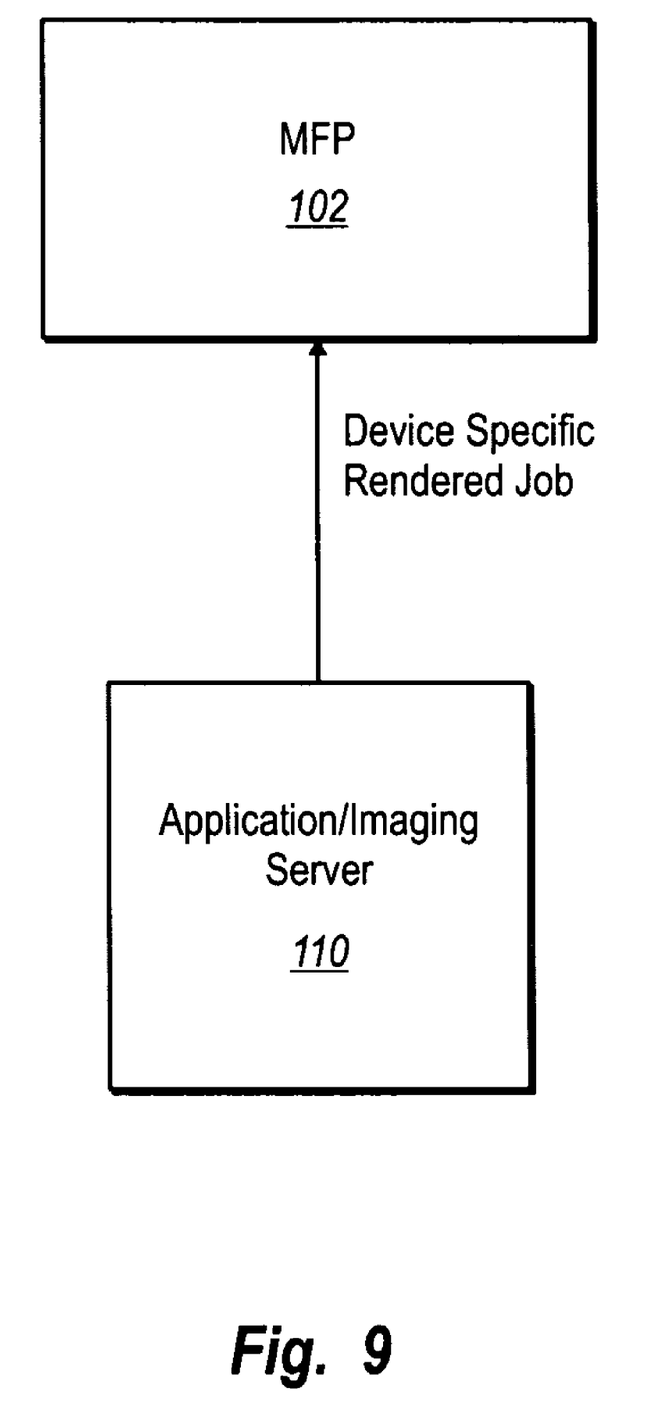
FIG. 9 illustrates an application/print server sending back a device specific rendered job to an MFP.

With reference now to FIG. 9, once the application/imaging server(s) 110 are selected, the imaging job is rendered on the selected application/imaging server(s) 110 and the device specific rendered job is sent to the imaging device or client (MFP 102). Thus, the imaging job or parts thereof are sent to the selected application/imaging servers for rendering into a format compatible with the imaging device or client. In addition to sending the imaging job, additional information may be sent, such as: (i) the output format to render the imaging data, and/or (ii) imaging instructions for emulation.

Upon receipt, the application/imaging server renders the imaging data into the specified format which is compatible with the imaging device or client. The rendering may also be guided by the imaging instructions, such as a paper size and resolution. Additionally, some of the imaging instructions may be emulated by the application/imaging server, as requested by the imaging device or client. Examples of imaging instructions that may be emulated include: (i) copy collation; (ii) page ordering (e.g., reverse order, booklet order, N-up, etc.); (iii) page scaling (e.g., N-up, booklet, print club, etc.); (iv) image enhancement; (v) spelling/grammar correction; (vi) indexing/sorting, (vii) language translation, (vii) content filtering (e.g., redacting), etc.

Any of the imaging instructions that are emulated are then deleted. Any imaging instructions that are partially emulated, are modified to reflect the remaining work to perform. Finally, the application/imaging server reconstructs the imaging job as follows: (i) imaging instructions minus the deletions, plus any modifications; and (ii) the imaging data in the new rendered format. The reconstructed imaging job is then sent back to the imaging device or client. And, the imaging device or client then performs the execution of the imaging job, as originally intended.

Figure 10:
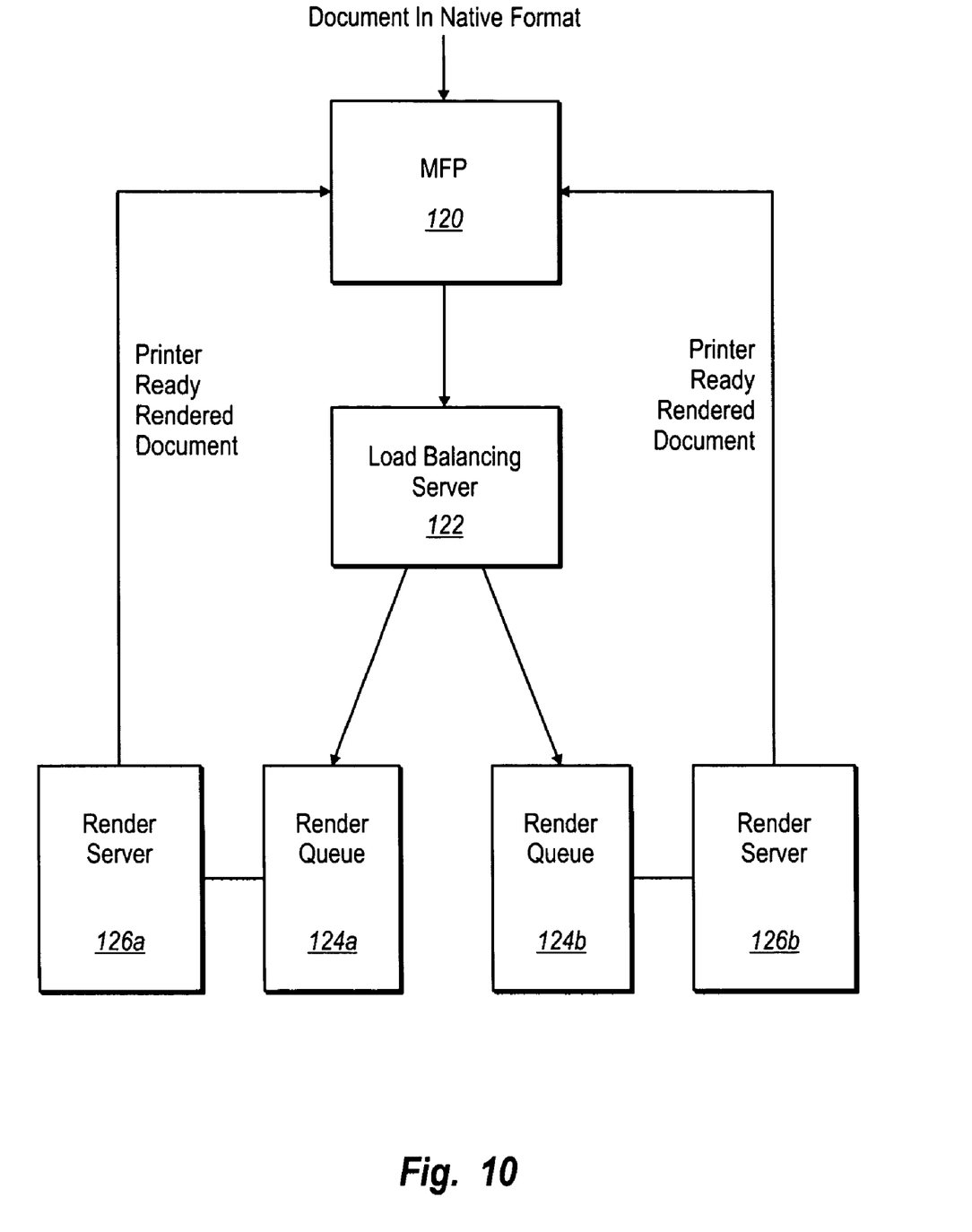
FIG. 10 illustrates another representative embodiment in accordance with the present invention.

With reference now to FIG. 10, another embodiment of the present invention is illustrated. In FIG. 10, a print/rendering job is received by an imaging device, illustrated as MFP 120, in a native format. MFP 120 communicates with load balancing server 122 for the rendering of the job. Load balancing server 122 selectively transmits information relating to the job to one or more job rendering queues 124, which in turn communicate with one or more corresponding job rendering servers 126. The one or more job rendering servers 126 process the job into a printer ready rendered document that is received by MFP 120 for the rendering of the job at MFP 120.

Those skilled in the art will appreciate that the methods and processes of the present invention can be used in a variety of print subsystems. Examples of such print subsystems include print subsystems of the Microsoft® Windows® operating system, Apple MacIntosh® Operating System, Linux® Operating System, System V Unix® Operating Systems, BSD Unix® Operating Systems, OSF Unix® Operating Systems, Citrix, IBM® Mainframe MVS Operating System, and IBM® AS/400.

Thus, as discussed herein, embodiments of the present invention embrace document rendering. In particular, the present invention relates to systems and methods for rendering a document in a native format at a printer device using a host service for rendering into printer ready data. In addition, when multiple compatible services are available, an optimal host service is determined and used for rendering into printer ready data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a job rendering system, a method for providing load balance rendering, the method comprising:
   receiving a request at an imaging device of the job rendering system to render an imaging job, wherein the request is in a native format and wherein the native format is not compatible with the imaging device;
   identifying one or more job rendering requirements of the imaging job;
   broadcasting the job rendering requirements from the imaging device to one or more imaging servers;
   receiving one or more responses from the imaging servers identifying an ability to process at least a part of the imaging job;
   selecting from the responses one or more of the imaging servers for use in processing at least a part of the imaging job;
   using the one or more selected imaging servers to process the imaging job; and
   rendering the imaging job.

2. A method as recited in claim 1, wherein said receiving a request at an imaging device of the job rendering system to render an imaging job comprises receiving, from a client device, imaging data and a set of imaging instructions compatible with the imaging device.

3. A method as recited in claim 1, wherein at least some of the request is not compatible with the imaging device.

4. A method as recited in claim 1, wherein the imaging device is at least one of: (i) a printer; (ii) a copier; (iii) a scanner; (iv) a facsimile device; (v) an image server (vi) a document server; (vii) an electronic whiteboard; (viii) a digital camera; (ix) a digital projection system; (x) a CD/DVD writer; (xi) a digital television; (xii) a satellite radio; and (xiii) a medical imaging device.

5. A method as recited in claim 1, wherein the responses include at least one of:
   (i) information identifying whether a corresponding imaging server of said imaging servers can render the imaging job into one or more formats compatible with the imaging device;
   (ii) information identifying which of said job rendering requirements can be emulated;
   (iii) information identifying an estimate as to when a corresponding imaging server of said imaging servers would be available for processing at least a portion of the imaging job; and
   (iv) information identifying an estimate as to a length of time a corresponding imaging server of said imaging servers would take to process the imaging job.

6. A method as recited in claim 1, wherein the imaging servers are computer devices that provide managed services to one or more other computer devices.

7. A method as recited in claim 1, wherein said job rendering requirements correspond to one or more of:
   (i) an imaging data format of the imaging job;
   (ii) converting imaging data of the imaging job into a rendered format; and
   (iii) an imaging job instruction that requires emulation.

8. A method as recited in claim 1, wherein said selecting from the responses one or more of the imaging servers for use in processing at least a part of the imaging job comprises selecting the one or more imaging servers based on at least one of:
   (i) a number of pending jobs;
   (ii) a size of the pending jobs; and
   (iii) a time needed to render the pending jobs.

9. A method as recited in claim 1, wherein said selecting from the responses one or more of the imaging servers for use in processing at least a part of the imaging job comprises selecting the one or more imaging servers based on at least one of (i) first available; (ii) performance; (iii) fastest to complete; (iv) emulation; and (v) output format.

10. A method as recited in claim 1, wherein the method further comprises receiving at the imaging device the imaging job processed by the one or more selected imaging servers, wherein the processed imaging job includes at least one of:
    (i) an output format for rendering the imaging job; and
    (ii) imaging instructions to emulate the imaging job.

11. In a job rendering system, a method for providing load balance rendering for direct printing, the method comprising:
    receiving a request at a client device of the job rendering system to render an imaging job, wherein the request includes a format that is non-compatible with the client device;
    identifying one or more job rendering requirements of the imaging job;
    broadcasting the job rendering requirements from the client device to one or more imaging servers;
    receiving one or more responses from the imaging servers identifying an ability to process at least a part of the imaging job;
    selecting from the responses one or more of the imaging servers for use in processing at least a part of the imaging job;
    using the one or more selected imaging servers to process the imaging job; and
    rendering the imaging job.

12. A method as recited in claim 11, wherein said rendering the imaging job is performed by the imaging device.

13. A method as recited in claim 11, wherein said rendering the imaging job comprises using an imaging device to render the imaging job according to the imaging instructions received by the client.

14. A method as recited in claim 13, wherein the imaging device is at least one of (i) a printer; (ii) a copier; (iii) a scanner; (iv) a facsimile device; (v) an image server (vi) a document server; (vii) an electronic whiteboard; (viii) a digital camera; (ix) a digital projection system; (x) a CD/DVD writer; (xi) a digital television; (xii) a satellite radio; and (xiii) a medical imaging device.

15. A method as recited in claim 11, wherein the responses include at least one of:
   (i) information identifying whether a corresponding imaging server of said imaging servers can render the imaging job into one or more compatible formats;
   (ii) information identifying which of said job rendering requirements can be emulated;
   (iii) information identifying an estimate as to when a corresponding imaging server of said imaging servers is available for processing at least a portion of the imaging job; and
   (iv) information identifying an estimate as to a length of time a corresponding imaging server of said imaging servers would take to process the imaging job.

16. A method as recited in claim 11, wherein said job rendering requirements correspond to one or more of:
   (i) an imaging data format of the imaging job;
   (ii) converting imaging data of the imaging job into a rendered format; and
   (iii) an imaging job instruction that requires emulation.

17. A method as recited in claim 11, wherein said selecting from the responses one or more of the imaging servers for use in processing at least a part of the imaging job comprises selecting the one or more imaging servers based on at least one of (i) first available; (ii) performance; (iii) fastest to complete; (iv) emulation; and (v) output format.

18. A method as recited in claim 11, wherein the method further comprises receiving at the client device the imaging job processed by the one or more selected imaging servers and sending the processed imaging job to an imaging device for rendering, wherein the processed imaging job includes at least one of:
   (i) an output format for rendering the imaging job; and
   (ii) imaging instructions to emulate the imaging job.

19. A method as recited in claim 18, wherein said rendering the imaging job is performed by the imaging device.

20. A computer program product stored in a computer readable medium for implementing within a computer system a method for providing load balance rendering for direct printing, the computer program product comprising:
   a computer readable medium for providing computer program code means utilized to implement the method, wherein the computer program code means is comprised of executable code for implementing the steps for:
      receiving a request at an imaging device of the computer system to render an imaging job, wherein the request is in a native format and wherein the native format is not compatible with the imaging device;
      identifying one or more job rendering requirements of the imaging job;
      broadcasting the job rendering requirements from the imaging device to one or more imaging servers;
      receiving one or more responses from the imaging servers identifying an ability to process at least a part of the imaging job;
      selecting from the responses one or more of the imaging servers for use in processing at least a part of the imaging job;
      using the one or more selected imaging servers to process the imaging job; and
      rendering the imaging job.

21. A computer program product stored in a computer readable medium as recited in claim 20, wherein at least some of the request received is not compatible with a particular imaging device used to perform said rendering the imaging job.

22. A computer program product stored in a computer readable medium as recited in claim 21, wherein the imaging device is at least one of: (i) a printer; (ii) a copier; (iii) a scanner; (iv) a facsimile device; (v) an image server (vi) a document server; (vii) an electronic whiteboard; (viii) a digital camera; (ix) a digital projection system; (x) a CD/DVD writer; (xi) a digital television; (xii) a satellite radio; and (xiii) a medical imaging device.

23. A computer program product stored in a computer readable medium as recited in claim 20, wherein the responses include at least one of:
   (i) information identifying whether a corresponding imaging server of said imaging servers can render the imaging job into one or more compatible formats;
   (ii) information identifying which of said job rendering requirements can be emulated;
   (iii) information identifying an estimate as to when a corresponding imaging server of said imaging servers is available for processing at least a portion of the imaging job; and
   (iv) information identifying an estimate as to a length of time a corresponding imaging server of said imaging servers would take to process the imaging job.

24. A computer program product stored in a computer readable medium as recited in claim 20, wherein said selecting from the responses one or more of the imaging servers for use in processing at least a part of the imaging job comprises selecting the one or more imaging servers based on at least one of:
   (i) a number of pending jobs;
   (ii) a size of the pending jobs; and
   (iii) a time needed to render the pending jobs.

25. A computer program product stored in a computer readable medium as recited in claim 20, wherein said selecting from the responses one or more of the imaging servers for use in processing at least a part of the imaging job comprises selecting the one or more imaging servers based on at least one of (i) first available; (ii) performance; (iii) fastest to complete; (iv) emulation; and (v) output format.

* * * * *